United States Patent [19]
Stadtfeld et al.

[11] Patent Number: 6,120,355
[45] Date of Patent: Sep. 19, 2000

[54] METHOD AND APPARATUS FOR LAPPING GEARS

[75] Inventors: Hermann J. Stadtfeld, Rochester; James J. Gnadt, Fairport; William D. McGlasson, Caledonia; Anthony J. Norselli, Rochester; David A. Wright, Victor, all of N.Y.

[73] Assignee: The Gleason Works, Rochester, N.Y.

[21] Appl. No.: 09/145,872

[22] Filed: Sep. 3, 1998

[51] Int. Cl.⁷ ....................................................... B24B 1/00
[52] U.S. Cl. .............................. 451/47; 451/47; 451/218; 451/219; 451/246; 451/253
[58] Field of Search .............................. 451/47, 218, 219, 451/246, 253

[56] References Cited

U.S. PATENT DOCUMENTS

| | | |
|---|---|---|
| 3,099,901 | 8/1963 | Hunkeler . |
| 3,142,940 | 8/1964 | Rebeski . |
| 3,717,958 | 2/1973 | Ellwanger et al. . |
| 5,609,058 | 3/1997 | Gnadt et al. . |

*Primary Examiner*—David A. Scherbel
*Assistant Examiner*—Shantese McDonald
*Attorney, Agent, or Firm*—Robert L. McDowell

[57] ABSTRACT

A machine for lapping or testing gears comprising a single machine column having a first side oriented perpendicular to a second side with the first side having a first workpiece spindle rotatable about a first axis and the second spindle having a second workpiece spindle rotatable about a second axis. The first workpiece spindle is movably secured to the first side and the second workpiece spindle is movably secured to the second side. The first and second workpiece spindles are movable with respect to one another along one or more of mutually perpendicular directions G, H and V. At least one, and preferably both, of the spindles are direct drive spindles. At any relative position of the spindles and their associated gear members along the G, H and V directions, the crossing points of their respective axes remains the same. For lapping, the machine further includes means to introduce lapping compound at the toe end of one of the members rotating in mesh at a location before the point of mesh.

23 Claims, 7 Drawing Sheets

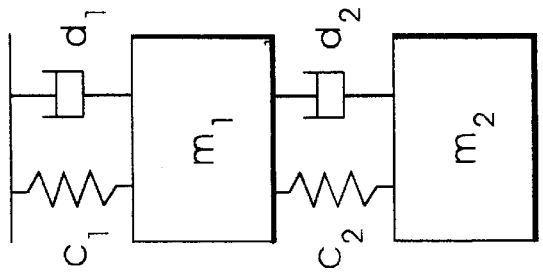
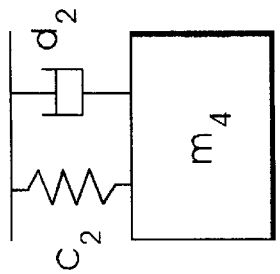
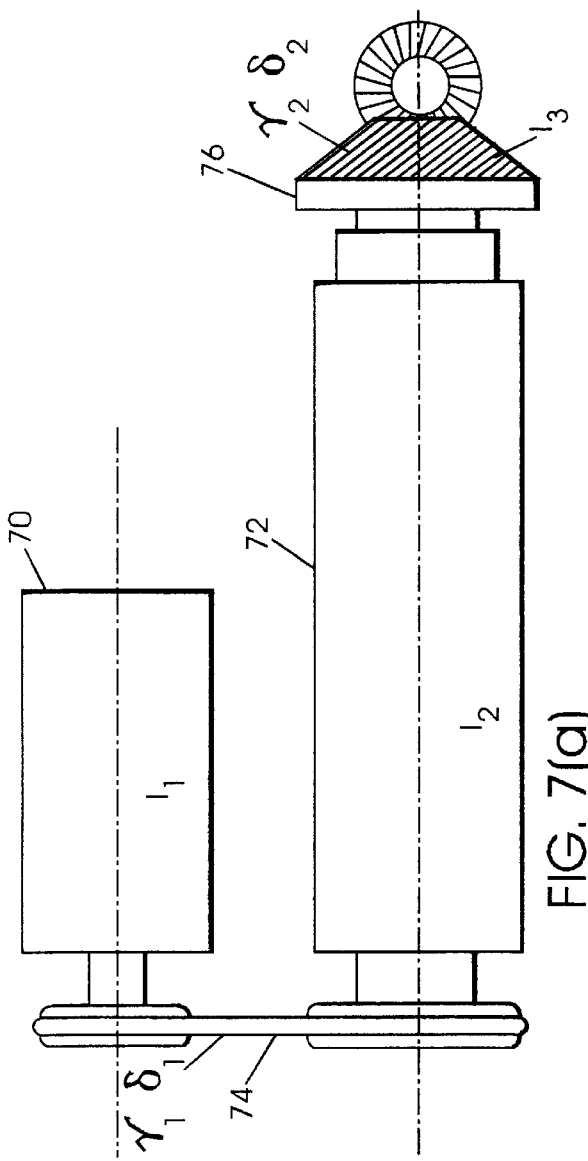
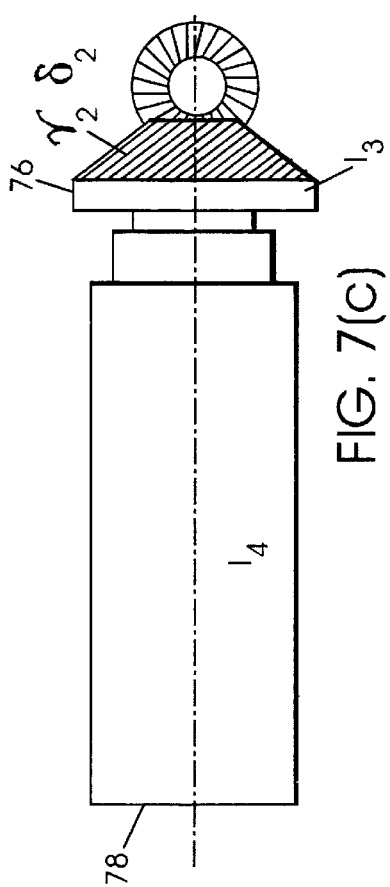

METHOD AND APPARATUS FOR LAPPING GEARS

FIELD OF THE INVENTION

The present invention is directed to a method and apparatus for testing or finishing gears. Specifically, the present invention discloses a method and apparatus for lapping bevel and hypoid gears.

BACKGROUND OF THE INVENTION

Lapping is a well established process for finishing the tooth surfaces of bevel gears. It is a process that provides an economical alternative to other hard finishing processes for bevel gears and it has been used in all areas except for some aircraft applications.

In the lapping process, a pinion and ring gear are mounted, via appropriate workholding equipment, to respective spindles in a lapping machine that has the same basic design as a testing machine. In most instances of rolling of the gearset, the pinion is the driving member and the ring gear is braked. The gears are rolled in mesh and lapping compound, which can be a mixture of oil (or water) and silicon carbide or similar abrasive, is poured into the meshing zone. Examples of lapping and/or testing machines can be found in U.S. Pat. Nos. 3,099,901 to Hunkeler; 3,142,940 to Rebeski; 3,717,958 to Ellwanger et al.; or, 5,609,058 to Gnadt et al.

Most lapping and testing machines have three degrees of freedom available for realizing relative motion between a ring gear and pinion. The first freedom being relative movement in the direction of the ring rear axis which shall be referred to as direction G or the G axis, the second freedom being relative movement in direction of the pinion axis which shall be referred to as direction H or the H axis, and the third degree of freedom being distance between the ring gear and pinion axes which shall be referred to as direction V or the V axis. The direction V is also known as the "hypoid offset."

In lapping or testing processes, relative movement in the V and H directions effect positional changes in the contact pattern of the members of the gearset, in effect modifying the contact pattern. Lapping involves rotating the gear members in mesh with contact at a desired position on the tooth surfaces. Thus, the members are located at particular V and H positions along with a particular G axis position to effect the desired backlash.

Typically, the V, H and G movements each have an effect on both the lengthwise and depthwise position of the localized tooth contact pattern, the primary effect of the V-axis movement being on the relative lengthwise position of the contact pattern, the primary effect of H-axis movement being on the relative depthwise position of the contact pattern, and the primary effect of G-axis movement being on the backlash.

As the gear set is lapped, contact is shifted toward one of the outer (heel) or inner (toe) portions of the tooth surface by changing the V and H settings as necessary to effect such a shifting of the contact position. As V and H are changed to effect the shifting, the G axis position must also be changed to maintain the desired backlash. When the desired heel or toe position is reached, V and H axes positions are again changed to shift contact to the other of the heel or toe positions with the changing V and H positions being accompanied by an appropriate G-axis change to maintain backlash. The contact position is then returned to the beginning position.

To date, the structure of lapping machines usually has been similar to the construction principle as bevel gear cutting and grinding machines except that in most lapping machines, the shaft angle is permanently set to 90°. Thus, lapping machines have one less degree of freedom than cutting and/or grinding machines.

However, such similarities to cutting and grinding machines results in many machine elements (for example, columns, slides and ways) lying between the ring gear and pinion members which introduces unwanted and uncontrolled compliance into the lapping process. Furthermore, with an increasing number of machine elements between the gearset members, the distance between the gearset members and the machine base undoubtedly increases, thus lessening the beneficial stiffness and stability effects provided by close proximity of the gearset members to the machine base.

It is an object of the present invention to provide a lapping machine which eliminates many of the machine elements between gearset members thereby enhancing machine stability.

It is a further object to provide a high speed lapping process including a method to introduce lapping compound during the high speed lapping as well as monitoring vibration of a gearset during lapping as a means to signal optimal conditions of the lapped gearset.

These and other objects and advantages of the present invention will appear more clearly from the following description and the accompanying drawings.

SUMMARY OF THE INVENTION

The present invention is directed to a machine for lapping or testing gears. The machine comprises a single machine column or base having a first side oriented perpendicular to a second side with the first side having a first workpiece spindle rotatable about a first axis and the second spindle having a second workpiece spindle rotatable about a second axis. The first workpiece spindle is movably secured to the first side and the second workpiece spindle is movably secured to the second side. The first and second workpiece spindles are movable with respect to one another along one or more of mutually perpendicular directions G, H and V. At least one, and preferably both, of the spindles are direct drive spindles.

The inventive machine is such that at any relative position of the spindles and their associated gear members along the G, H and V directions, the crossing points of their respective axes remains the same.

The machine of the present invention further includes means to introduce lapping compound at the toe end of one of the members rotating in mesh at a location before the point of mesh.

BRIEF DESCRIPTION OF THE DRAWINGS

FIGS. 7(a), 7(b), 7(c), and 7(d) illustrate rotational and corresponding linear dynamic system representations of a prior art spindle and the spindle of the present invention.

DETAILED DESCRIPTION OF THE PREFERRED EMBODIMENT

The details of the present invention will now be discussed with reference to the accompanying drawings.

Figure 1:
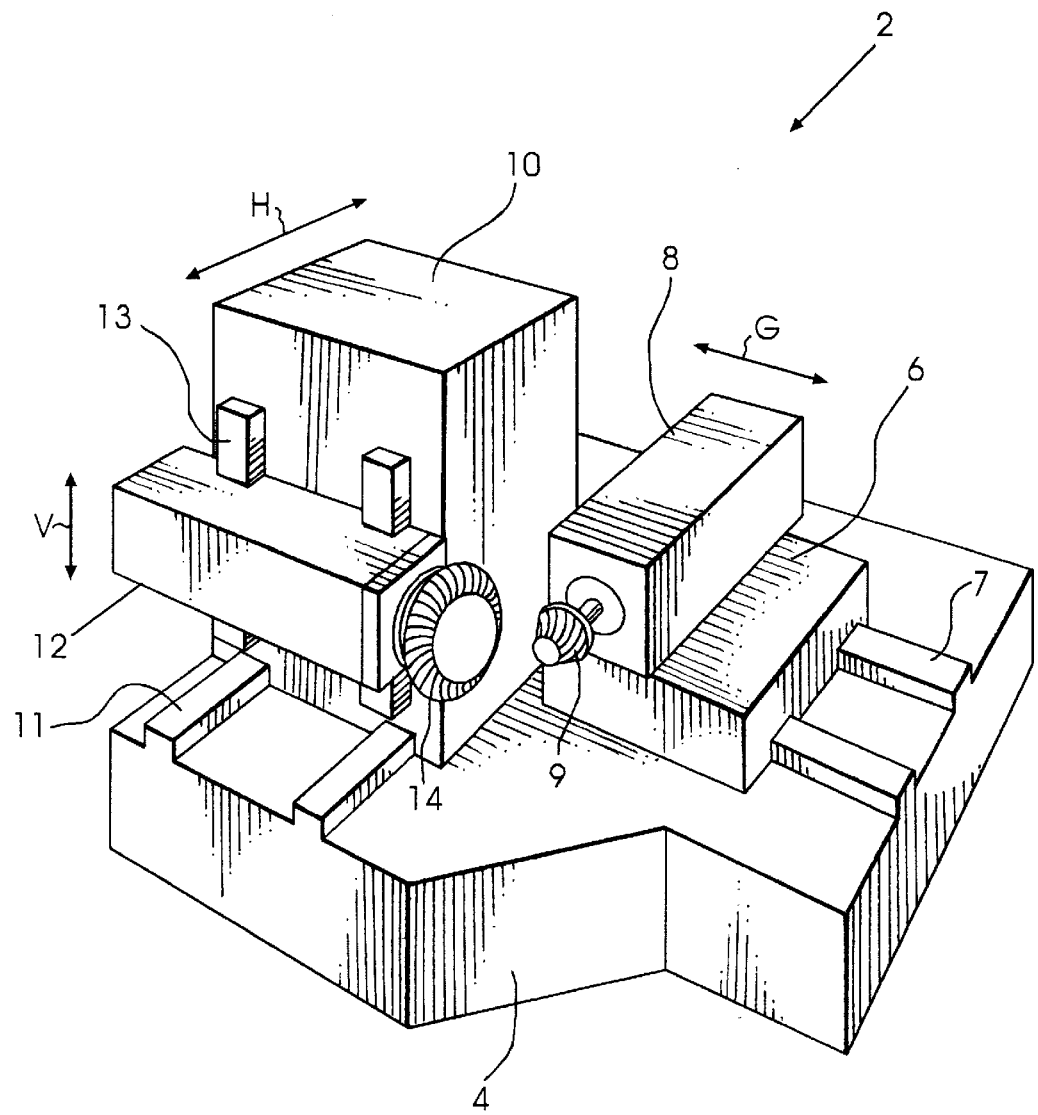
FIG. 1 schematically illustrates a prior art lapping machine.

FIG. 1 shows a lapping machine 2 of the prior art wherein the machine comprises a frame 4 on which is located a pinion column 6 movable in a direction G on the frame 4 via ways 7. Located on pinion column 6 is a spindle 8 for rotating a pinion member 9 about its axis. Also located on frame 4 is gear column 10 movable in a direction H via ways 11 positioned on the frame 4. Gear spindle 12 is mounted to gear column 10 and is movable along ways 13 in a direction V. Gear 14 is rotatable about its axis on gear spindle 12. Directions G, H and V are mutually perpendicular with respect to one another.

With the lapping machine of FIG. 1, the gear spindle 12 is located well above the frame and thus, spindle 12 lies at a distance from the machine stiffness provided by the frame 4. Furthermore, there are several machine elements between the pinion spindle 8 and the ring gear spindle 12. Both of these conditions result in an accumulation of compliance. While some rotational compliance may be desirable, the prior art lapping machine introduces compliance in the three linear directions G, H and V which lowers the positioning accuracy of the pinion and ring gear in space.

Another disadvantage of the prior art machine of FIG. 1 is that the spindle crossing point of the spindle axes changes depending on such factors as different size jobs, different ratios and different work holding equipment. The spindle crossing point is a point defined by the crossing of the spindle axes and is independent of any distance (V direction) between them.

Figure 2:
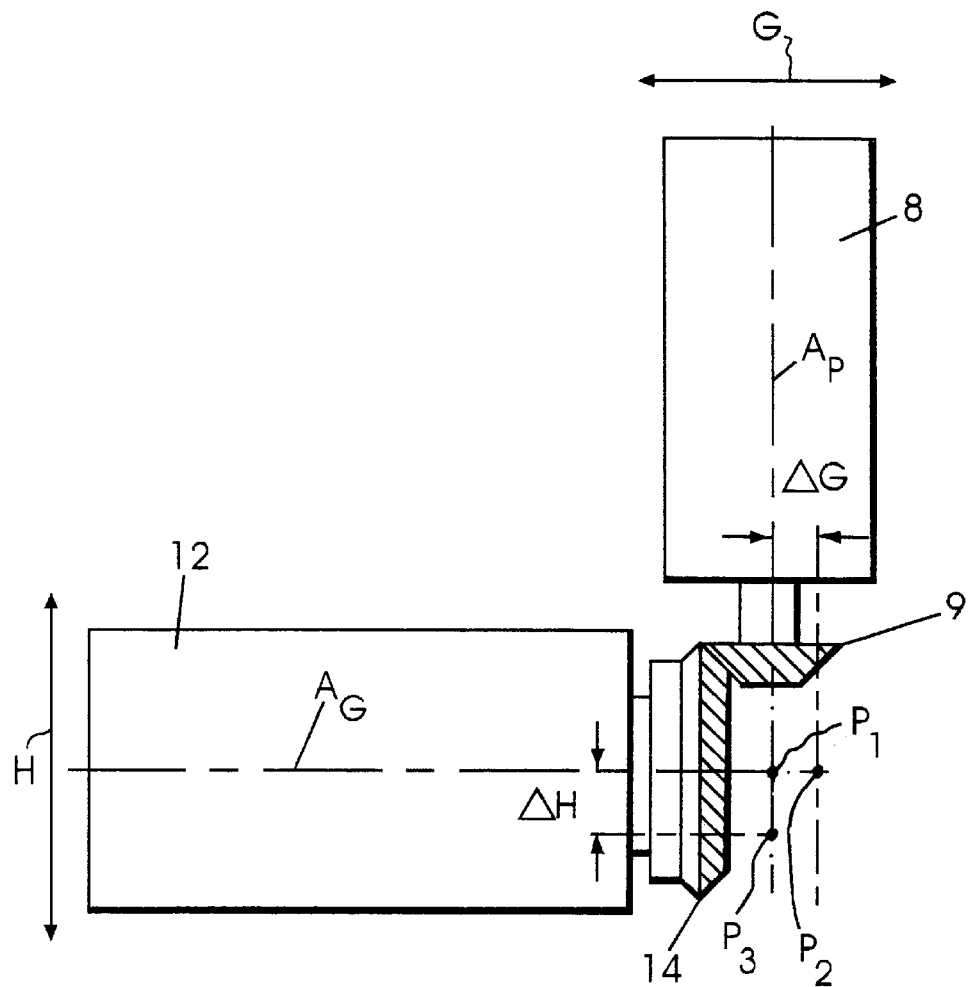
FIG. 2 shows a top view of the spindle arrangement of the prior art machine of FIG. 1.

FIG. 2 illustrates the crossing point of the machine of FIG. 1 by showing the spindles of FIG. 1 in a top view which effectively disregards the V direction. It can be understood that when the gear pair members (9, 14) are engaged as shown, the gear spindle axis, $A_G$, and the pinion spindle axis, $A_P$, cross as point $P_1$. However, if a change then occurs such as described above, for example gears of different sizes are lapped, the crossing point must change. If the pinion member 9 to be lapped is of a larger size, the pinion spindle axis $A_P$ may need to be moved by some amount $\Delta G$ from its initial position to account for the increased gear member diameter. In doing so, the spindle axes crossing point moves to $P_2$. In the same manner, if a larger gear member 14 is to be lapped, a shift, $\Delta H$, in the position of the gear spindle axis $A_G$ is necessary. Thus it can be seen the spindle axes crossing point changes to $P_3$.

The undesirable effects of positional changes of the spindle axes crossing point are that they contribute to an inconsistent dynamic behavior for different jobs as well as necessitating a larger machining chamber.

Figure 3:
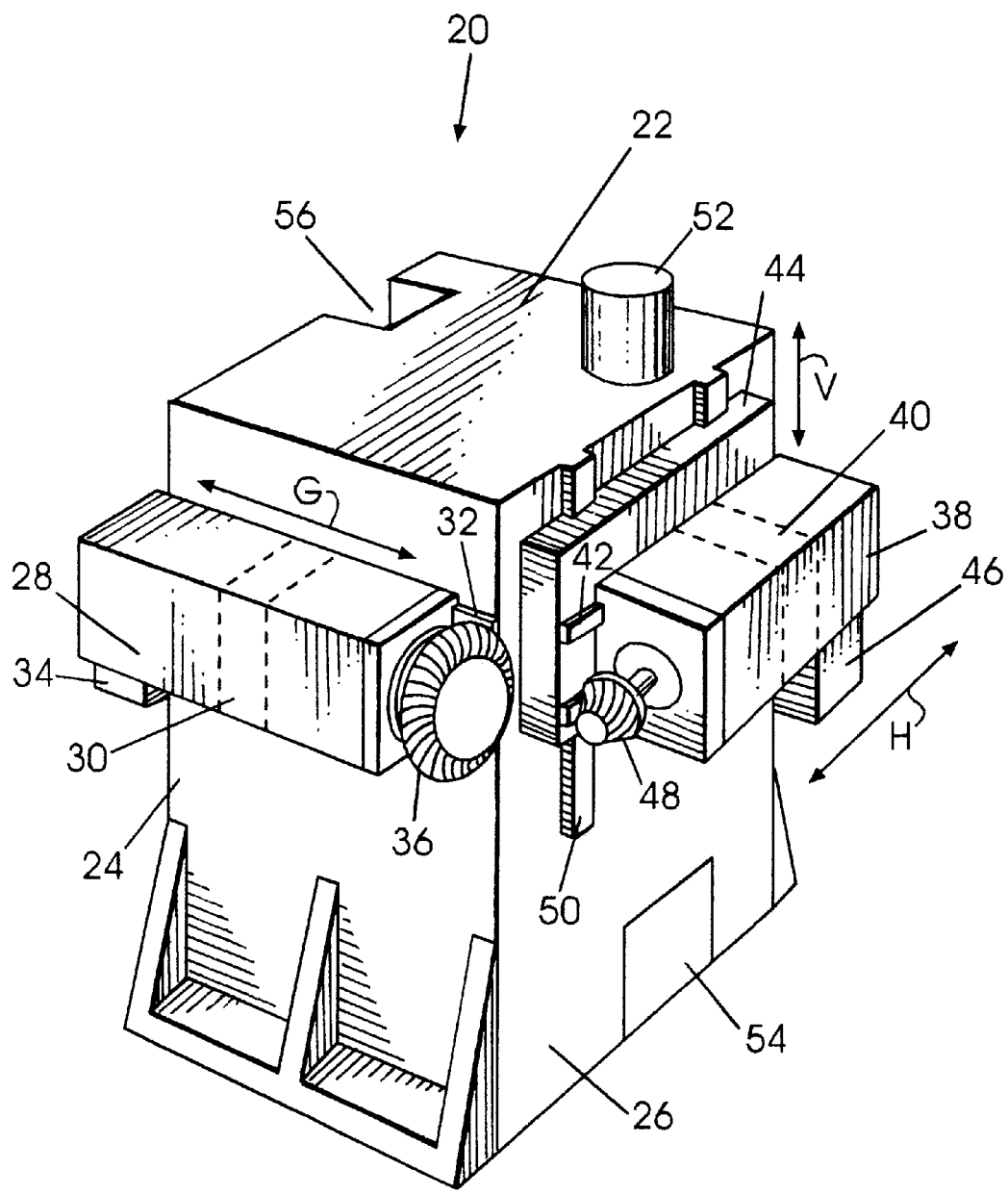
FIG. 3 schematically illustrates the lapping machine in accordance with the present invention.

The above disadvantages are eliminated by the present inventive lapping machine which is illustrated in FIG. 3 and designated generally by 20. For ease in viewing the various machine components, FIG. 3 illustrates the inventive machine without doors and exterior sheet metal. The machine 20 comprises a single column 22 that may also be thought of as the machine frame. Column 22 comprises at least three sides, preferably four sides, with at least two of the sides, first side 24 and second side 26, being perpendicular to one another. Each of the first and second sides comprises a width and a height (as viewed in FIG. 3).

First side 24 includes first workpiece spindle 28 which is rotatable about axis $A_G$ (FIG. 4) and is preferably driven by a direct drive motor 30, preferably liquid-cooled, mounted between front and rear spindle bearings (not shown). Spindle 28 is movable along the width of first side 24 in direction G on ways 32 attached directly to column 22. Movement of spindle 28 in direction G is provided by motor 34 through a direct-coupled ballscrew (not shown). Preferably, a bevel ring gear member 36 is releasably mounted to spindle 28 by suitable workholding equipment as is known in the art.

Second side 26 includes second workpiece spindle 38 which is rotatable about axis $A_P$ (FIG. 4) and is preferably driven by a direct drive motor 40, preferably liquid-cooled, mounted between front and rear spindle bearings (not shown) with motor 40 capable of attaining a pinion rotation of about 4000 RPM (the RPM of motor 30 would be: pinion RPM/ratio of the gearset).

Spindle 38 is movable along the width of second side 26 in direction H on ways 42 attached to slide 44. Movement of spindle 38 in direction H is provided by motor 46 through a direct-coupled ballscrew. Preferably, a pinion member 48 is releasably mounted to spindle 38 by suitable workholding equipment as is known in the art. Workpiece spindle 38 is also movable along the height of second side 26 in direction V since slide 44 is movable in the V direction via ways 50 with movement being provided by motor 52 through a direct-coupled ballscrew. Directions G, H and V are mutually perpendicular with respect to one another. For practical purposes as well as for purposes of illustration, in FIG. 1, the V direction is vertical.

Movement of first work spindle 28 in direction G, second work spindle 38 in direction H, slide 44 in direction V, as well as first spindle rotation and second spindle rotation, is imparted by the separate drive motors 34, 46, 52, 30 and 40 respectively. The above-named components are capable of independent movement with respect to one another or may move simultaneously with one another. Each of the respective motors is associated a feedback device such as a linear or rotary encoder (not shown) as part of a CNC system which governs the operation of the drive motors in accordance with instructions input to a computer controller such as the Fanuc model 16i.

A tank for holding lapping compound is preferably placed under second spindle 38 adjacent to second side 26 as outlined by 54. In this manner, the tank can remain within the exterior sheet metal housing thus keeping the machine footprint size at a minimum. Also, a cutout area 56 of the column 22 may be included at an area of the column remote from the spindles for placement of any necessary electrical transformers. With this arrangement, such electrical components can also stay within the exterior sheet metal enclosure and yet be spaced far enough from the spindles such that heat radiating from the electrical components will not adversely influence the accuracy of the spindles or other tolerance sensitive elements.

With the arrangement of FIG. 3, machine compliance due to several machine elements is avoided. First work spindle 28 is attached to column 22 while second work spindle 38 has only slide 44 between it and column 22. Thus, when compared to the prior art machine of FIG. 1, uncontrolled compliance is significantly reduced and any desired compliance can be controlled by machine motions in the G, H and/or V directions.

With direct drive spindles 28 and 38, inertia of the spindle unit is less than the spindles of the prior art and with the elimination of a remote drive motor, belt and pulleys, the dynamics of the drive system are also greatly reduced and simplified. FIGS. 7(a)–7(d) dynamically illustrate the spindle of a prior art lapping machine and the spindle of the lapping machine of the present invention. In the prior art arrangement of FIG. 7(a), a motor 70 with an inertia $I_1$ is connected to a spindle 72 via a drive belt 74 having a rotational spring rate $\gamma_1$ and a rotational damping factor $\delta_1$. Spindle 72 has inertia $I_2$ and workpiece 76 has inertia $I_3$. Since spindle 72 and workpiece 76 are rigidly connected through workholding equipment, only one rotational spring rate $\gamma_2$ and one rotational damping factor $\delta_2$ apply to these components.

Representing the rotational dynamic system of FIG. 7(a) in the correspondingly accurate linear system model of FIG. 7(b), the inertia $I_1$ of motor 70 is represented by mass m1 and the rotational spring rate $\gamma_1$ and rotational damping factor $\delta_1$ are represented by linear spring rate $c_1$ and linear damping factor $d_1$. In the same manner, mass $m_2$ of FIG. 7(b) corresponds to rotational inertias $I_2$ and $I_3$ while spring rate $c_2$ and damping factor $d_2$ correspond to the rotational spring rate $\gamma_2$ and damping factor $\delta_2$. In looking at the linear system of FIG. 7(b) it is apparent that the prior art spindle and drive arrangement 70, 72, 74 results in a two-degree of freedom dynamic system, $m_1c_1d_1$ and $m_2c_2d_2$.

With the spindle and direct drive arrangement 78 of the present invention as shown in FIG. 7(c), there is no remote motor, pulleys and belts as in FIG. 7(a). Thus, the rotational dynamic degree of freedom, $I_1\gamma_1\delta_1$, of FIG. 7(a) does not exist in the present invention. The only inertia in the spindles of the present invention is the inertia $I_4$ of the spindle and its direct drive components, and the inertia of the workpiece $I_3$ with the rotational spring rate $\gamma_2$ and damping factor $\delta_2$ which, with respect to $I_3$, $\gamma_2$ and $\delta_2$, would be unchanged from the arrangement of FIG. 7(a). Looking at the corresponding linear dynamic model in FIG. 7(d), a single mass $m_4$ is representative of inertias $I_3$ and $I_4$ while spring rate $c_2$ and damping factor $d_2$ correspond to the rotational spring rate $\gamma_2$ and damping factor $\delta_2$. Therefore, it is clear that the present invention offers a reduction to a simplified one-degree of freedom dynamic system, $m_4c_2d_2$.

Figure 4:
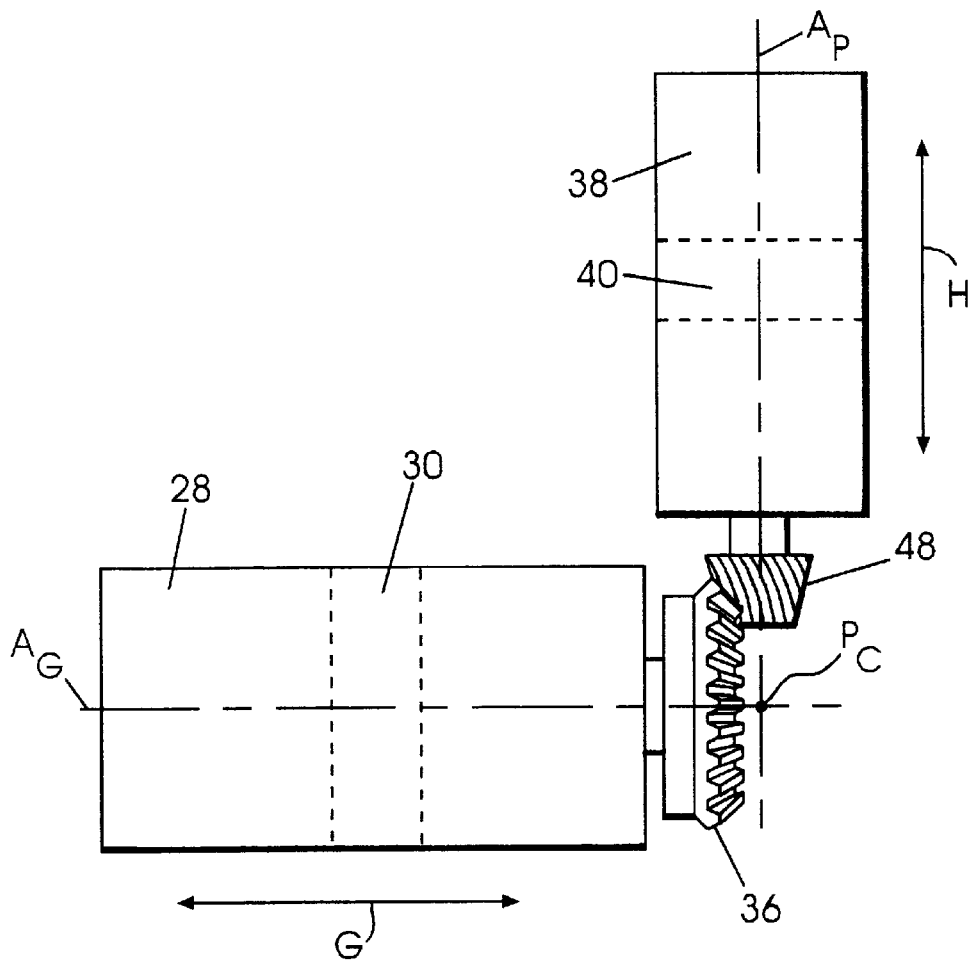
FIG. 4 shows a top view of the spindle arrangement of the inventive machine of FIG. 3.

Furthermore, the machine of the present invention accomplishes movement in the G and H directions while keeping the crossing point $P_C$ of the spindle axes in the same location. As can be seen in FIG. 4, movement of first work spindle 28 in the G direction is movement, $\Delta G$, along axis $A_G$ and hence, does not change the position of axis $A_G$. Thus, the location of crossing point $P_C$ is unaffected. In a similar manner, movement of second work spindle 38 in the H direction is movement, $\Delta H$, along axis $A_P$ which does not change the position of axis $A_P$. Again, the location of crossing point $P_C$ remains unaffected. It can therefore be seen that regardless of the sizes or ratios of the workpieces, or the type of workholding equipment, the crossing point $P_C$ of the present invention will not change which greatly enhances the dynamic behavior of the machine. Another advantage brought about by the stationary crossing point $P_C$ is that the machining chamber is smaller thereby making it easier for a machine operator or automated loading/unloading equipment to gain access to the workpieces. Also in the present invention, the machining chamber is located at the corner of the machine, further enhancing the ease of accessibility.

Lapping with the present invention can take place at very high speeds, for example, pinion rotation at about 2500–4000 RPM, which is generally about three times faster than conventional lapping. If a gearset having a ratio of 3:1 is lapped at a pinion speed of 3500 RPM, the ring gear member of the set will rotate at about 1170 RPM. The circumferential speed of the lapping process for a 220 mm ring gear diameter is about 13 m/s and the centrifugal acceleration on the outer ring gear diameter (acceleration=velocity $^2$/radius) is about 1540 m/s$^2$, or more than three times that of conventional high speed lapping.

However, above a centrifugal acceleration of about 450 m/s$^2$, lapping compound will spin off the ring gear and not stay in the gear mesh. The pinion reaches this limit much sooner because of the higher RPM. Given this effect, consideration must be given to the manner in which lapping compound is applied such that it is present in the contact zone in spite of the centrifugal throw-off effect.

Figure 5:
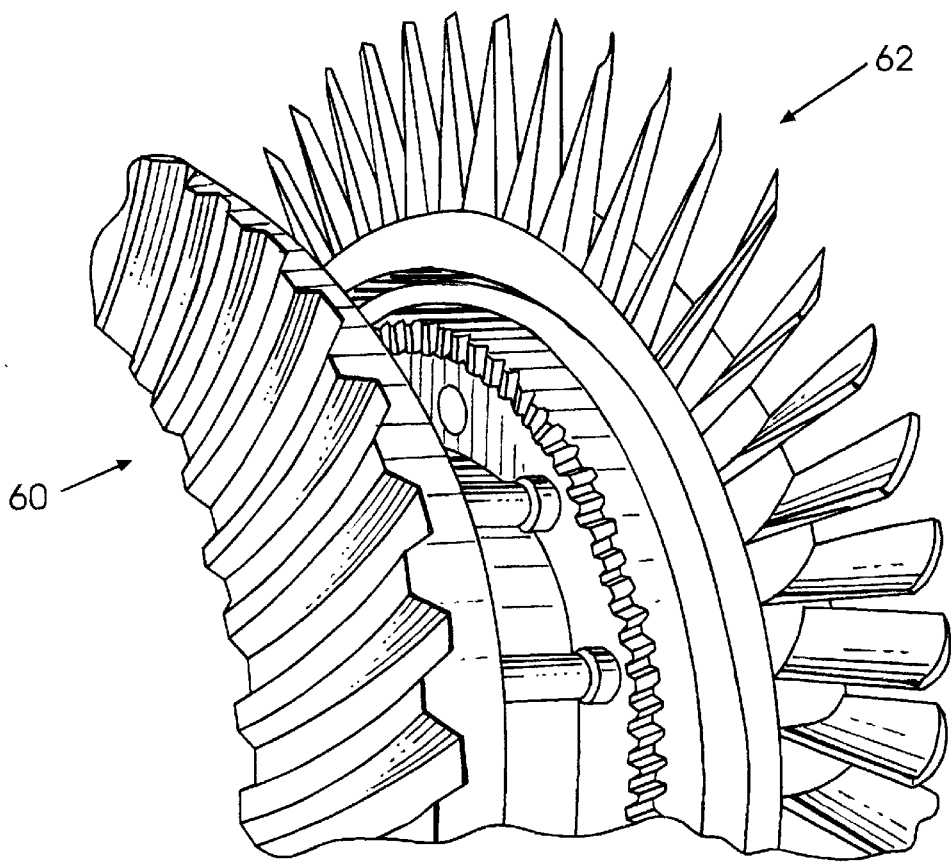
FIG. 5 is a comparison illustration of the teeth of a bevel ring gear with the blades of a turbine.

From FIG. 5 it can be seen that the spatial shape of a ring gear 60 has some similarity with a turbine blade 62. The twist on a turbine blade moves a gas or liquid axially by rotation of the turbine wheel. The cross section between two blades is smaller at the inner end and bigger at the outer diameter. Liquid, presented to the inner diameter of a turbine pump starts to spin around with the blades. The centrifugal force moves it to the outer diameter where the cross section between the blades is bigger. This movement introduces suction towards the inner diameter that helps the centrifugal force to pump the fluid from the inner to the outer diameter.

Figure 6:
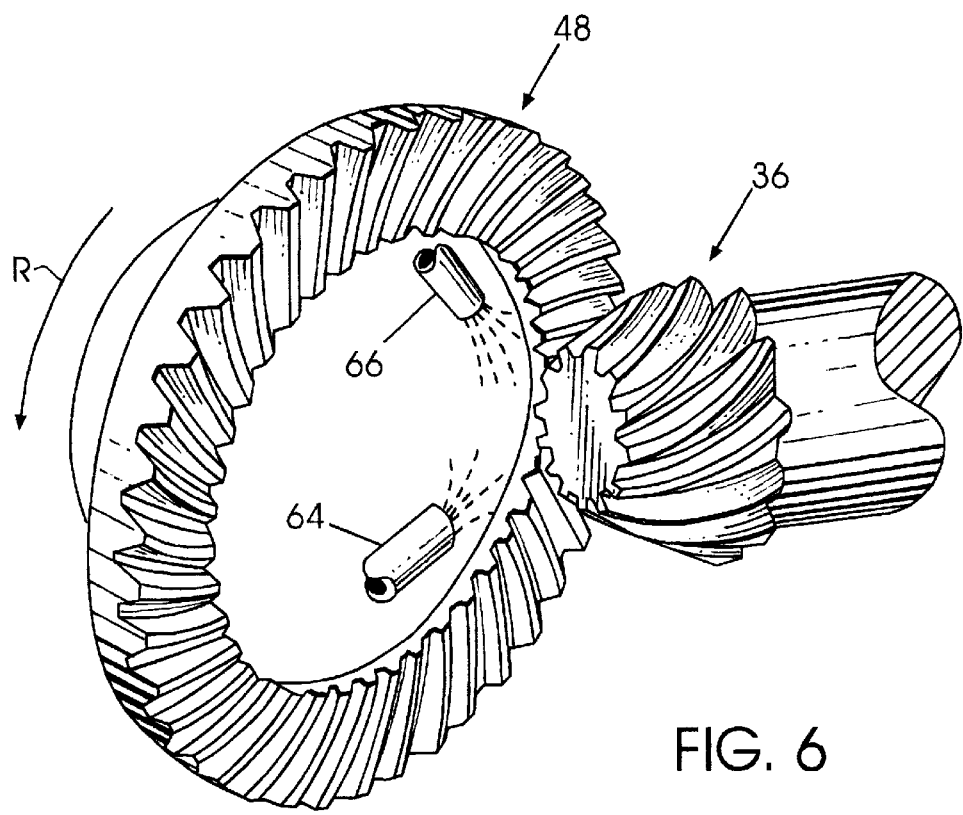
FIG. 6 shows the application of lapping compound to a rotating gearset.

The inventors have discovered that the above principle also has application in lapping procedures where high speeds are utilized as described above. The lapping compound is sprayed tangentially onto the toe (inner) end of the ring gear 48 in the direction of rotation R as is shown by nozzle 64 in FIG. 6. The speed of the lapping compound exiting nozzle 64 should be about the same as the circumferential speed of the inner ring gear diameter. The lapping compound has to be sprayed onto the ring gear 48 before meshing occurs with pinion 36 such that the lapping compound is pumped into the tooth slots before meshing contact starts. Of course, it can be seen that for rotation in a direction opposite that shown by R in FIG. 6, a nozzle 66 is necessarily located on the other side of pinion 36.

The present inventive machine may further include seismic measurement of structure born noise during the lapping process. A three dimensional accelerometer may be connected to either spindle but preferably the ring gear spindle. Real-time vibrations or fast Fourier transformation results are available to monitor the lapping cycles. During the development of a lapping program for a gearset, the accelerometer may remain active to monitor some or all gear sets. After completing the development, the characteristic vibration scheme of a good gearset is stored in an evaluation computer. At this point, tolerances can be applied to provide a spectrum of permissible values where production gearsets are accepted as non-rejected, good gearsets.

In production, lapping is continued until the vibration result is close to the possible optimum for the particular gear pair. This closest point is defined as the time when vibration amplitudes turn from decreasing to increasing. The measured closest point amplitude is compared to the acceptable tolerance band established during development of the gearset and the gearset is accepted or rejected.

With this method, the lapping process is terminated individually after the vibration amplitude turning point is reached. Since pinions and ring gears coming from heat treatment have some amount of individual distortions, the best lapping result for a particular gear pair is not expected to be the same for all gearsets in the production batch. The individual termination of the lapping process assures a higher and more consistent quality of the finished gearsets as well as the shortest cycle times.

Figure 8:
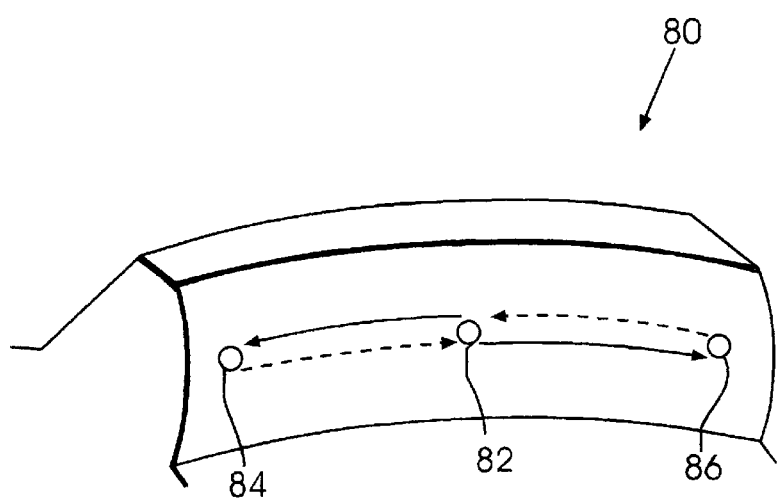
FIG. 8 illustrates a three-point lapping pattern on a tooth surface.

The present invention also contemplates changing speed and/or braking torque from point to point on a tooth surface during the lapping process. FIG. 8 shows a tooth 80 on which three points are located, center point 82, toe-end point 84 and heel-end point 86. During a lapping process, for example, contact would begin at center point 82, shift to toe point 84, move back to center 82 and on to heel point 86 before returning to center 82. If a speed of 3000 RPM and a braking torque of 5 Nm (Newton-meter) are desired at center point 82 and a speed of 2000 RPM and a braking torque of 3 Nm are desired at toe point 84, the present invention provides for the transition in speeds and torques to take place linearly during the move from point 82 to point 84 whereas in the prior art, the described change would be made abruptly at or prior to point 84. Such abrupt changes result in a stepped surface being formed on the tooth surface which leads to increased noise in the gearset. The inventive method provides for a smooth transition thus avoiding the formation of a stepped tooth surface. It is to be understood that the linear transition between points can be between any points on the tooth surface, for example between toe point 84 and heel point 86 in FIG. 8. The present method also applies to tooth surfaces having any number of predetermined tooth surface points, such as six or nine.

Furthermore, the transition between multiple points on a tooth surface may be different between each set of points. As an example, the desired speed and torque values at point 84 may be 2000 RPM and 2 Nm, respectively, while those at center point 82 may be 3000 RPM and 5 Nm. As lapping proceeds from point 84 to point 82, there would be a linear transition between these point values. However, at heel end point 86, the desired lapping values may be 3800 RPM and 6 Nm. Thus, a linear transition between the values at center point 82 and heel point 86 would occur. As is clear, the transition rate of change between points 84 and 82 is different that the rate of change between points 82 and 86.

Although the present invention has been discussed and illustrated with respect to a lapping machine, the inventive machine may also function as a testing machine for bevel and hypoid gears. In a testing machine, the tooth surfaces of one member of the pair, usually the gear member, are coated with a marking compound and then run the pair together under a light load. Marking compound will be removed from areas of the gear tooth surface which come into contact with tooth surfaces of the mating pinion member resulting in a contact pattern or "footprint" being revealed on the tooth surfaces of the gear. The position and length of the contact pattern can then be evaluated. The direct drive motors of the present invention provide for testing procedures to be carried out under high speeds while the single column concept offers high strength and accuracy.

Also in a testing machine, the fixed crossing point offers extremely good acoustic conditions for noise vibration testing since machine acoustics will remain substantially constant even with movement in the G, H and V directions. On prior art machines in which the crossing point varies, machine acoustics change as the crossing point position changes thus making noise evaluation difficult.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A machine for lapping or testing gears, said machine comprising:

a single machine column having a first side oriented perpendicular to a second side;

said first side having a first workpiece spindle rotatable about a first axis, said first workpiece spindle being movably secured to said first side;

said second side having a second workpiece spindle rotatable about a second axis, said second workpiece spindle being movably secured to said second side;

said first and second workpiece spindles being movable with respect to one another along one or more of mutually perpendicular directions G, H and V.

2. The machine of claim 1 wherein said first side has a width and a height with said first workpiece spindle being movable in direction G along said width.

3. The machine of claim 2 wherein said first spindle is movable in said width direction G via ways secured to the first side of said column.

4. The machine of claim 1 wherein said second side had a width and a height with said second workpiece spindle being movable in direction H along said width and in direction V along said height.

5. The machine of claim 4 wherein said second spindle is movable in said width direction H via ways secured to a slide, said slide being movable in said height direction V via ways secured to the second side of said column.

6. The machine of claim 1 wherein at least one of said first and second spindles are direct drive spindles.

7. The machine of claim 1 wherein said first and second axes cross to define a crossing point, said crossing point remaining the same regardless of the relative position of said first and second spindles along one or more of said directions G, H and V.

8. The machine of claim 1 wherein said first spindle includes a bevel ring gear mounted thereon for rotation about said first axis and wherein said second spindle includes a mating pinion mounted thereon for rotation about said second axis.

9. The machine of claim 8 wherein said mating pinion comprises a mating hypoid pinion.

10. The machine of claim 1 further including an accelerometer connected to said first workpiece spindle for measuring vibration during lapping.

11. The machine of claim 1 being a lapping machine.

12. The machine of claim 11 further comprising means to introduce a lapping compound to a rotating and meshing gear set during a lapping process, each member of said gear set comprising teeth having a toe end and a heel end.

13. The machine of claim 12 wherein the lapping compound introducing means is positioned whereby once the gear set is rotating in mesh, lapping compound is introduced at the toe end of the teeth of one of said members at a location before said teeth enter into mesh with teeth of the other member.

14. The machine of claim 13 wherein said lapping compound is applied in a direction tangentially onto said toe end of said one member in the direction of rotation.

15. The machine of claim 13 wherein said lapping compound is applied at a velocity approximately the same as the circumferential velocity of the toe end of said one member.

16. The machine of claim 13 wherein said one member is a ring gear.

17. The machine of claim 1 being a testing machine.

18. A lapping machine for gears, said machine comprising:
- a machine frame having a first side oriented perpendicular to a second side;
- said first side having a first workpiece spindle rotatable about a first axis, said first workpiece spindle being movably secured to said first side, said first workpiece spindle being rotatable by a direct drive motor;
- said second side having a second workpiece spindle rotatable about a second axis, said second workpiece spindle being movably secured to said second side, said second workpiece spindle being rotatable by a direct drive motor;
- said first and second workpiece spindles being movable with respect to one another along one or more of mutually perpendicular directions G, H and V,
- means to introduce a lapping compound to a rotating and meshing gear set during a lapping process;
- wherein said first and second axes cross to define a crossing point, said crossing point remaining the same regardless of the relative position of said first and second spindles along one or more of said directions G, H and V.

19. A method of lapping mating members of a gear set, said method comprising:
- providing a machine having a single machine column with said column having a first side oriented perpendicular to a second side, said first side having a first workpiece spindle rotatable about a first axis with said first workpiece spindle being movably secured to said first side, said second side having a second workpiece spindle rotatable about a second axis with said second workpiece spindle being movably secured to said second side, said first and second workpiece spindles being movable with respect to one another along one or more of mutually perpendicular directions G, H and V;
- mounting a first member of said gear set to said first spindle;
- mounting a second member of said gear set to said second spindle;
- bringing said first and second member into mesh and rotating said members in mesh;
- applying a lapping compound to said rotating members;
- adjusting the relative position of said members while rotating in mesh to move tooth contact bearing to different locations along the tooth surfaces of said members, said adjusting taking place in one or more of said directions G, H and V;
- whereby said first and second axes cross to define a crossing point, and during said adjusting said crossing point remaining the same regardless of the relative position of said members along one or more of said directions G, H and V.

20. The method of claim 19 wherein said lapping compound is applied at the toe end of the teeth of one of said members at a location before said teeth enter into mesh with teeth of the other member.

21. The method of claim 20 wherein said lapping compound is applied in a direction tangentially onto the toe end of said one member in the direction of rotation.

22. The method of claim 20 wherein said lapping compound is applied at a velocity approximately the same as the circumferential velocity of the toe end of said one member.

23. The method of claim 20 further including measuring vibration of the members during said lapping, said lapping continuing for such a time as the measured vibration decreases and said lapping being terminated at such a time as an increase in measured vibration is detected.

* * * * *